April 30, 1968 F. B. MOSSBURG ET AL 3,380,612
OUTLET BOX
Filed Feb. 17, 1966
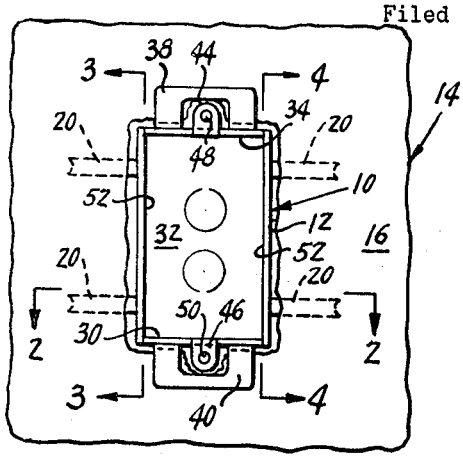
FIG.1
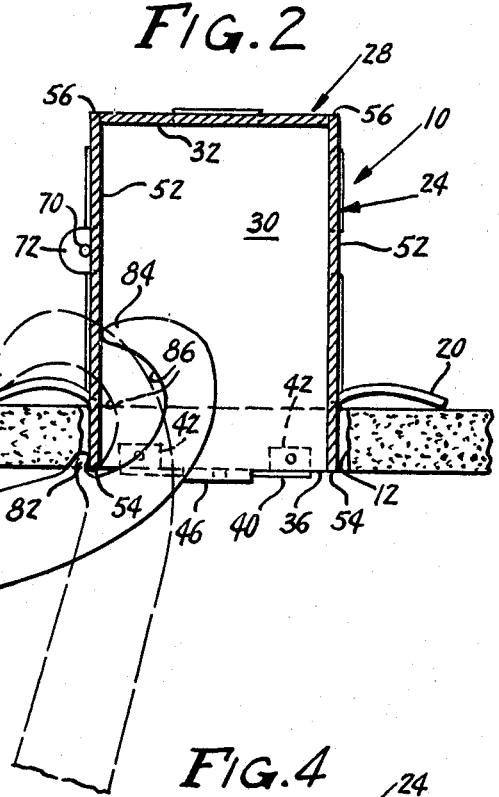
FIG.2
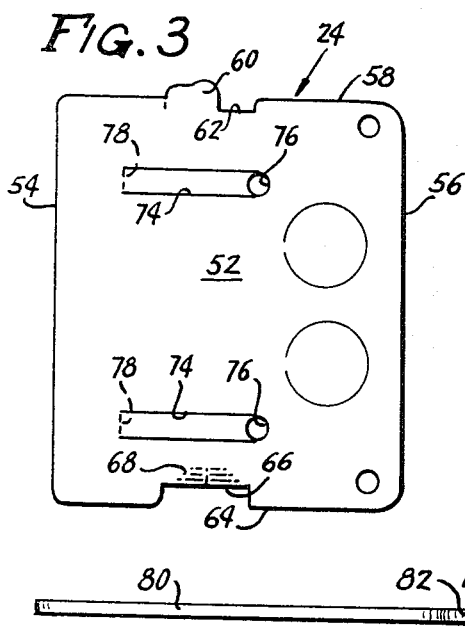
FIG.3
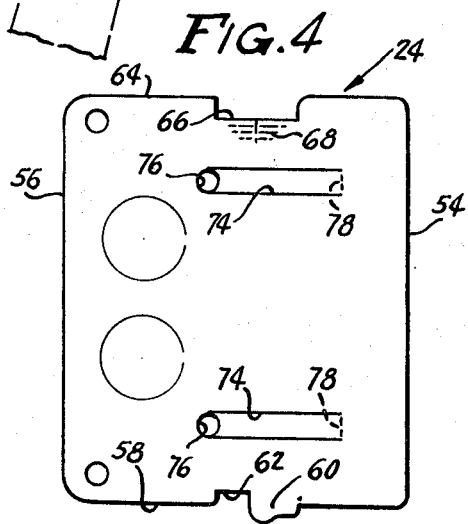
FIG.4
FIG.5
INVENTORS.
FRANK B. MOSSBURG
HAROLD F. CAMPBELL
BY Kimmel, Crowell & Weaver
ATTORNEYS.

United States Patent Office 3,380,612
Patented Apr. 30, 1968

3,380,612
OUTLET BOX
Frank B. Mossburg, 5510 Southwick St., and Harold F. Campbell, 5515 Southwick St., both of Bethesda, Md. 20034
Filed Feb. 17, 1966, Ser. No. 528,036
7 Claims. (Cl. 220—3.6)

ABSTRACT OF THE DISCLOSURE

An electrical equipment housing for insertable mounting through an opening formed in a wall, the housing having an open face and lateral flanges projecting outwardly therefrom to engage the outer side of the wall and to prevent overinsertion of the housing, the housing further including weakened portions formed in the walls thereof and a tool engageable therewith to displace the weakened portions to form laterally projecting tongues engageable with the inner side of the wall to prevent withdrawal of the housing through the opening, and the flanges and tongues cooperating with one another to clamp and secure the housing fixedly on the wall.

---

This invention relates to electrical outlet boxes of the type which are assembled in a wall to receive electrical components, such as switches, female electrical plugs and the like. In particular, this invention relates to an outlet box which may be inserted into an opening in a wall and then manipulated by a tool of the instant invention to secure the box therein.

As conducive to an understanding of the instant invention, a short summary of the conventional method of positioning an outlet box in a wall opening will be briefly described. The actual opening in the wall is formed in any convenient manner, as by a saber saw or the like, with a pair of Madison straps being placed with the cross bar interior of the opening. Briefly, a Madison strap is a generally T-shaped structure having an elongate cross bar of greater length than the length of the opening and a plurality of bendable shanks which extend through the opening into the room. The outlet box will then be inserted into the opening between the Madison straps with the bendable shanks being bent to overlap the forward edge of the outlet box. It will be evident that the elongate cross bar and the bendable shanks will cooperate to prevent the outlet box from moving through the opening into the room. Conventional outlet boxes are also equipped with a flange substantially flush with the open face thereof extending perpendicularly outwardly therefrom for contacting the exterior face of the wall thereby preventing the outlet box from sliding completely through the opening into the space between the walls.

Although the use of Madison straps makes a relatively secure connection and one that is suitable for the purposes intended, it is apparent that a considerable number of manipulative steps are necessary to position an outlet box using these devices. Although a considerable amount of practice will instruct an individual in the rapid placement of an outlet box by using Madison straps, a much simpler and swifter manner of installing outlet boxes has long been sought by the prior art.

It is accordingly an object of the instant invention to provide an outlet box, tool and method of installing the outlet box in a wall opening in a manner that is rapid, convenient and easily learned.

Another object of the instant invention is to provide an outlet box in which a portion of the walls thereof may be severed to form tongues for engaging the inner side of the wall to prevent the box from sliding forwardly through the opening into the room.

A still further object of the instant invention is to provide an outlet box of the character described in which the tongues may be readily formed by providing weakened areas in the receptacle walls.

A still further object of the instant invention is to provide an outlet box of the character described in which the weakened areas are formed by score lines.

A still further object of the instant invention is to provide a tool which may be used to form the tongues for holding the outlet box in position in a wall opening.

Still another object of the instant invention is to provide a rapid and simple method of installing an outlet box in a wall opening.

Other objects and advantages of the instant invention reside in the combinations of elements and manipulative steps, arrangements of parts and manipulative steps, and features of construction and utilization, all of which will be more fully pointed out hereinafter and disclosed in the accompanying drawing wherein there is shown a preferred embodiment of this inventive concept.

In the drawing:

FIGURE 1 is a front elevational view of a portion of a wall forming an opening in which the outlet box of the instant invention is positioned;

FIGURE 2 is a horizontal cross-sectional view of the structure depicted in FIGURE 1, taken substantially along line 2—2 thereof as viewed in the direction indicated by the arrows, the tool of the instant invention being shown in solid lines before the formation of the receptacle retaining tongues and being shown in dashed lines after the formation thereof;

FIGURE 3 is an elevational view of one of the side walls of the rectangular receptacle of the outlet box of FIGURE 1 as may be seen along line 3—3 as viewed in the direction indicated by the arrows;

FIGURE 4 is an elevational view of the opposite side wall of the rectangular receptacle of the outlet box of FIGURE 1 as may be seen along line 4—4 thereof as viewed in the direction indicated by the arrows; and FIGURE 5 is a side elevational view of the tool shown in FIGURE 2.

Referring now to the drawing in detail, wherein like reference characters designate like elements throughout the several views thereof, there is shown generally at 10 the outlet box of the instant invention positioned in an opening 12 formed in a wall shown generally at 14. As will be apparent from FIGURE 2, outlet box 10 is inserted through opening 12 until the open face thereof is substantially coplanar with an external surface 16 of wall 14 at which time a tongue forming tool shown generally at 18 is utilized to sever a plurality of tongues 20 from outlet box 10 to engage an internal surface 22 of wall 14. It will be apparent that tongues 20 prevent outlet box 10 from movement through opening 12 into the room of which wall 14 is a part.

Outlet box 10 includes a pair of side walls shown generally at 24 and a U-shaped structure shown generally at 28 which acts to provide a bottom wall 30, a rear wall 32 and a top wall 34 of the receptacle. After outlet box 10 is secured in opening 12, as will be more fully explained hereinafter, the electrical components which are to be received therein, such as a switch, a female electrical outlet or the like, may be inserted through an open face 36 which is substantially flush with exterior surface 16 of wall 14.

As may be seen best in FIGURES 1 and 2, a pair of retaining flanges 38, 40 are positioned adjacent open face 36 on bottom and top walls 30, 34 to prevent outlet box 10 from being inserted entirely through opening 12. Retaining flanges 38, 40 are substantially perpendicular to outlet box 10 and include a plurality of angled segments 42 secured to bottom wall 30 and top wall 34.

As seen in FIGURE 1, retaining flanges 38, 40 are U-shaped in configuration to receive an ear 44, 46 formed by top wall 34 and bottom wall 30. Each of ears 44, 46 forms an internally threaded aperture 48, 50 to receive a screw for securing the electrical components in the receptacle formed by outlet box 10. As may be seen in FIGURE 2, ears 44, 46 are substantially flush with open face 36 and slightly recessed with respect to retaining flanges 38, 40. Although flanges 38, 40 and ears 44, 46 perform different functions, it should be understood that a single member may be utilized to perform these separate functions.

Referring now to FIGURES 3 and 4, it will be seen that side walls 24 are substantially identical except that the rightmost side wall is rotated 180° about an axis drawn perpendicular through the center thereof. Each of side walls 24 includes a plate 52 preferably made of metal having substantially straight front edges 54 which cooperate to form a part of open face 36. Rear edges 56 are substantially parallel to front edges 54 and lie flush with rear wall 32 of U-shaped structure 28 as may be seen in FIGURE 2. In order to secure side walls 24 to U-shaped structure 28, a transverse edge 58 forms an upstanding ear 60 adjacent which is positioned an indentation 62. It will be understood that U-shaped structure 28 is provided with ears similar to ears 60 to be positioned in indentation 62 such that these ears may be twisted with ears 60 to provide a secure connection between side walls 24 and U-shaped structure 28.

Side walls 24 form another transverse edge 64 having an indentation 66 pressed inwardly as at 68 to receive another type of fastener such as a screw 70 inserted through an ear 72 formed on bottom and top walls 30, 34 as may be seen in FIGURE 2. It will be readily apparent that screw 70 cooperates with recess 68 and that ears 60 cooperate with similarly formed ears on U-shaped structure 28 to provide a securely constructed rectangular receptacle to receive the electrical components which are to be inserted into outlet box.

An important feature of the instant invention resides in the provision of at least one elongate weakened area 74 formed on side walls 24 generally transverse of plate 52 and preferably parallel to transverse edges 58, 64. Weakened area 74 may be formed in any suitable manner, as by the provision of parallel score lines or by reducing the metal thickness of area 74 by stamping or the like. An aperture 76 is preferably formed at the end of weakened area 74 nearest rear edge 56 for purposes more fully pointed out hereinafter. The terminus 78 of weakened area 74 nearest front edge 54 may similarly be weakened with the understanding that when tool 18 is applied, terminus 78 will not be broken.

When tool 18 is applied, weakened area 74 will be severed from plate 52 beginning at aperture 76 and extending toward terminus 78 such that tongue 20 will be formed to engage internal surface 22 of wall 14. The formation of tongues 20 will prevent outlet box 10 from being pulled forwardly through opening 12. It will thus be seen that outlet box 10 is secured in opening 12 since retaining flanges 38, 40 prevent the rearward movement of outlet box 10 through opening 12.

As may be seen in FIGURE 5, tool 18 is preferably a rather thin instrument having a handle 80, a holding protuberance 82 and a tongue forming hook 84 positioned on an arcuately reverted end of tool 18 substantially coplanar with holding protuberance 82. Tool 18 also forms an arcuately concave segment 86 spanning the distance between protuberance 82 and hook 84 to allow concave segment 86 to come in contact with tongue 20 in order to smoothly bend it into engagement with internal surface 22. It will be apparent that the gap between side wall 24 and opening 12 is sufficient to receive protuberance 82 therebetween with handle 80 being of a sufficient length to provide leverage adequate to sever tongue 20 from plate 52.

It is now seen that there is herein provided an improved outlet box which accomplishes all of the objects of the instant invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

We claim:

1. An outlet box for electrical components to be inserted through an opening in a wall comprising:
    a receptacle having walls forming an enclosure and an open front, the enclosure walls including means for forming a tongue to be pressed into engagement with the interior surface of the wall adjacent the opening, said tongue forming means including a weakened area on the receptacle walls; and
    at least one flange on the receptacle adjacent the open front, extending outwardly substantially perpendicular to the receptacle preventing the receptacle from being pushed through the wall opening.

2. The outlet box of claim 1 wherein the weakened area is bounded on at least two sides by score lines.

3. The outlet box of claim 2 wherein the outermost end of the tongue forming means is an aperture formed in the receptacle wall.

4. The device of claim 1 further including a tool for forming the tongue, the tool including a handle, a holding protuberance for engaging the outer surface of the enclosure wall adjacent the open front and a tongue forming hook spaced from the holding protuberance and handle to engage the weakened area, the hook and protuberance being substantially coplanar on the same side of the tool.

5. The combination of claim 4 wherein the tool forms an arcuately concave surface between the holding protuberance and the hook for engaging the tongue to curve it into engagement with the interior surface of the wall.

6. The method of installing an electrical receptacle in an opening formed by a wall, the electrical receptacle including a compartment having an opening to receive electrical components and at least one flange extending away from the opening to prevent overinsertion of the receptacle into the opening, comprising the steps of:
    placing the receptacle into the opening until the flanges contact the exterior surface of the wall;
    depressing a tongue formed by the receptacle into engagement with the interior surface wall to secure the receptacle into the opening;
    said depressing step being accomplished by a tool having a tongue forming hook on one extremity and a holding protuberance spaced from the hook and includes;
    placing the holding protuberance against the outer side of the receptacle wall adjacent the component receiving opening;

placing the tongue forming hook against the interior wall of the receptacle; and pivoting the tool about the holding protuberance to sever the tongue from the receptacle wall into engagement with the interior surface of the wall.

7. The method of claim 6 wherein the pivoting step includes forming the tongue in an arcuately convex segment, the forward end of which engages the interior surface of the wall.

References Cited

UNITED STATES PATENTS 2,769,562   11/1956   Rudolph _____ 220—3.6

THERON E. CONDON, *Primary Examiner.*

JAMES B. MARBERT, *Examiner.*